United States Patent
Maddali et al.

(12) 
(10) Patent No.: US 12,000,581 B1
(45) Date of Patent: Jun. 4, 2024

(54) EXTERIOR DECORATIVE LIGHTING

(71) Applicant: GOODRICH CORPORATION, Charlotte, NC (US)

(72) Inventors: Yaswanth Kumar Maddali, Bangalore (IN); Abhilash Krishna, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/114,016

(22) Filed: Feb. 24, 2023

(30) Foreign Application Priority Data

Dec. 2, 2022 (IN) .............................. 202241069698

(51) Int. Cl.
| | | |
|---|---|---|
| *F21V 5/00* | (2018.01) | |
| *B64C 23/06* | (2006.01) | |
| *F21V 5/04* | (2006.01) | |
| *F21W 104/00* | (2018.01) | |
| *F21W 107/30* | (2018.01) | |
| *F21Y 115/10* | (2016.01) | |

(52) U.S. Cl.
CPC ............ *F21V 5/046* (2013.01); *B64C 23/069* (2017.05); *F21V 5/008* (2013.01); *F21W 2104/00* (2018.01); *F21W 2107/30* (2018.01); *F21Y 2115/10* (2016.08)

(58) Field of Classification Search
CPC ....... F21V 5/046; F21V 5/008; F21Y 2115/10
See application file for complete search history.

(56) References Cited

U.S. PATENT DOCUMENTS

| | | | |
|---|---|---|---|
| 7,717,594 B2 | 5/2010 | Clark | |
| 9,751,638 B1 | 9/2017 | Gagnon et al. | |
| 10,730,639 B2 * | 8/2020 | Depta | ....................... B64C 5/06 |
| 10,780,991 B1 | 9/2020 | Edquist et al. | |
| 10,843,815 B2 | 11/2020 | Edwards et al. | |
| 11,447,268 B2 | 9/2022 | Viswambaran | |
| 2012/0195056 A1 * | 8/2012 | Edmond | .............. G02B 6/0008 |
| | | | 362/470 |
| 2013/0051044 A1 * | 2/2013 | Edmond | ................ B64D 47/06 |
| | | | 362/470 |
| 2013/0249375 A1 | 9/2013 | Panagotacos et al. | |
| 2018/0016032 A1 * | 1/2018 | Jha | ......................... B64D 47/02 |
| 2019/0092412 A1 * | 3/2019 | Yokosuka | ................ B62J 6/055 |

(Continued)

FOREIGN PATENT DOCUMENTS

| | | |
|---|---|---|
| EP | 3747759 | 12/2020 |
| WO | 2004000645 | 12/2003 |

OTHER PUBLICATIONS

European Patent Office, European Search Report dated Mar. 18, 2024 in Application No. 23211543.6.

*Primary Examiner* — Evan P Dzierzynski
(74) *Attorney, Agent, or Firm* — SNELL & WILMER L.L.P.

(57) ABSTRACT

A system is provided for illuminating a winglet cap of a winglet. The system includes the winglet cap, a light source, a total internal reflection (TIR) lens positioned in proximity to the light source, and a prismatic lens positioned between the light source and the winglet cap. In the system, light produced by the light source reflects off a surface of the TIR lens and passes through the prismatic lens. In the system, the prismatic lens bends the light and directs the bent light toward an inside surface of the winglet cap.

18 Claims, 5 Drawing Sheets

(56) References Cited

U.S. PATENT DOCUMENTS

2019/0291894 A1* 9/2019 Hessling-Von Heimendahl .........
B64D 47/06
2020/0198530 A1* 6/2020 Hellin_Navarro ... B60Q 1/2696

* cited by examiner

EXTERIOR DECORATIVE LIGHTING

CROSS-REFERENCE TO RELATED APPLICATIONS

This application claims priority to, and the benefit of, India Patent Application No. 202241069698 (DAS CODE: 7CF2), filed Dec. 2, 2022, and titled "EXTERIOR DECORATIVE LIGHTING," which is incorporated by reference herein in its entirety for all purposes.

FIELD

The present disclosure relates to systems and methods for exterior decorative lighting on an aircraft, and more specifically, to exterior decorative lighting and lens arrangement for transmission of light normal to a curved surface at various points on an aircraft winglet.

BACKGROUND

Enterprise branding appears on most vehicles. As enterprises compete in the global economy, standing apart from similar enterprises is important. Branding is not just about logos and colors, but it is the identity of the enterprise. In vehicles such as aircrafts, airline operator's branding covers almost the entirety of the aircraft. On such modern aircraft, navigation lights are typically positioned at the tip of the wing. In various instances, wingtip lights may be included along with the conventional navigation and anti-collision lights. Such wingtip lights provide additional visibility to pilots on other aircrafts to avoid the obstruction and, along with this benefit, provides a unique, decorative look to the aircraft.

SUMMARY

Disclosed herein is a system for illuminating a winglet cap of a winglet. The system includes the winglet, the winglet cap positioned on a leading edge of the winglet; a light source disposed within the winglet; a total internal reflection (TIR) lens positioned in proximity to the light source; and a prismatic lens positioned between the light source and the winglet cap, where light produced by the light source reflects off a surface of the TIR lens and passes through the prismatic lens, and where the prismatic lens bends the light and directs the light toward an inside surface of the winglet cap.

In various embodiments, the TIR lens surrounds the light source. In various embodiments, the light reflected off the surface of the TIR lens contacts the inside surface of the prismatic lens. In various embodiments, the inside surface of the prismatic lens is a combination of several straight edges with different inclinations with respect to an opposing surface of the prismatic lens. In various embodiments, responsive to the light reflected off the surface of the TIR lens contacting a straight edge of the inside surface of the prismatic lens, the light is bent towards a normal of the straight edge so that the light is transmitted through the prismatic lens substantially perpendicular to the straight edge. In various embodiments, responsive to the light exiting an outside surface of the prismatic lens, the light is bent away from the normal of the straight edge. In various embodiments, the inside surface of the prismatic lens is formed to substantially match a contour of the winglet cap.

In various embodiments, the light source and the prismatic lens are coupled to support structures that allow the light source and/or the prismatic lens to translate so as to either increase or decrease a mating distance between the light source and/or the prismatic lens and the inside surface of the winglet cap. In various embodiments, the winglet cap further includes a plurality of holes through which the light passes. In various embodiments, the plurality of holes is configured in a pattern within the winglet cap. In various embodiments, the plurality of holes are drilled perpendicular to a face of the winglet cap. In various embodiments, the light source is at least one of a light emitting diode (LED), an ultra-LED, a micro-LED, an organic LED, a quantum dot LED, or a compact fluorescent light (CFL).

Also disclosed herein is an aircraft including a system for illuminating a winglet cap of a winglet. The aircraft includes the aircraft; the winglet coupled to a wing of the aircraft; the winglet cap positioned on a leading edge of the winglet; a light source disposed within the winglet; a total internal reflection (TIR) lens positioned in proximity to the light source; a prismatic lens positioned between the light source and the winglet cap; a controller; and a tangible, non-transitory memory configured to communicate with the controller, the tangible, non-transitory memory having instructions stored thereon that, in response to execution by the controller, cause the controller to perform operations including: controlling the light source to generate a first light, where the first light produced by the light source reflects off of a surface of the TIR lens and passes through the prismatic lens and where the prismatic lens bends the first light and directs the first light toward an inside surface of the winglet cap.

In various embodiments, the TIR lens surrounds the light source. In various embodiments, the first light reflected off of the surface of the TIR lens contacts the inside surface of the prismatic lens. In various embodiments, the inside surface of the prismatic lens is a combination of several straight edges with different inclinations with respect to an opposing surface of the prismatic lens. In various embodiments, responsive to the first light reflected off the surface of the TIR lens contacting a straight edge of the inside surface of the prismatic lens, the first light is bent towards a normal of the straight edge so that the first light is transmitted through the prismatic lens substantially perpendicular to the straight edge. In various embodiments, responsive to the light exiting an outside surface of the prismatic lens, the light is bent away from the normal of the straight edge. In various embodiments, the inside surface of the prismatic lens is formed to substantially match a contour of the winglet cap.

In various embodiments, the light source and the prismatic lens are coupled to support structures that allow the light source and/or the prismatic lens to translate so as to either increase or decrease a mating distance between the light source and/or the prismatic lens and the inside surface of the winglet cap. In various embodiments, the winglet cap further includes a plurality of holes through which the first light passes. In various embodiments, the plurality of holes is configured in a pattern within the winglet cap. In various embodiments, the plurality of holes are drilled perpendicular to a face of the winglet cap. In various embodiments, the light source is at least one of a light emitting diode (LED), an ultra-LED, a micro-LED, an organic LED, a quantum dot LED, or a compact fluorescent light (CFL).

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
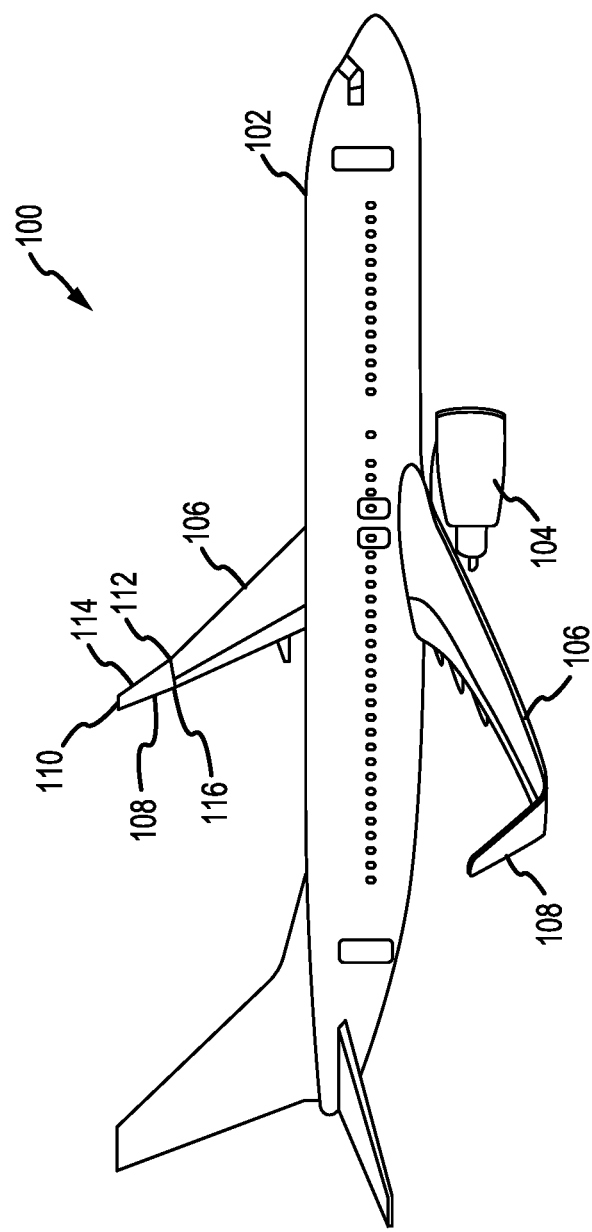
FIG. 1 illustrates a perspective view of an aircraft having winglets, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Again, on modern aircraft, navigation lights are typically positioned at the tip of the wing. However, some modern aircrafts include what is referred to as "winglet" at the tips of the aircraft's wing. A winglet enhances the aerodynamic properties of the wing to which it is attached. However, on such modern aircraft that include winglets, the navigation lights are still typically positioned at the tip of the wing, inboard from the winglet. Thus, the aircraft's winglets are often bland, with a piece of material, such as metal, carbon fiber, among others, referred to as a winglet cap, completing the leading edge of the winglet.

While the winglet cap along the leading edge of the aircraft may not be replaced with a lens, as with other exterior lights on the aircraft, due its low radius of curvature, in various embodiments, holes may be provided in the winglet cap along the leading-edge area of the winglet cap. In various embodiments, the holes along the leading-edge area of the winglet cap allow light provided by back illumination to pass through and the winglet may be illuminated by a pattern of holes. The holes are typically drilled perpendicular to the face of the winglet cap for manufacturing purposes, as well as strength of the material forming the winglet cap. The challenge with this design is that a skin of the winglet cap is highly contoured, whereas the light of the back illumination travels linearly, which means holes with axes only along the light path are well illuminated and those holes not on the axes of the light path may not be well illuminated.

Disclosed herein are systems and methods for illuminating the winglets of an aircraft to provide additional visibility, improve decorative aspects, and promote branding. In various embodiments, secondary refractive optics are provided that ensures the light directed at it is redistributed in a pattern normal to the skin of the winglet cap. In various embodiments, the secondary refractive optics are constructed of high temperature resistant optical materials to withstand deicing air. In various embodiments, the secondary refractive optics may be positioned at predetermined distance from the leading edge of the winglet cap that is normal of the outmost holes within the leading edge of the winglet cap. In various embodiments, the light source that is projected through the secondary refractive optics is a linear module with a collimated light output.

Referring now to FIG. 1, in accordance with various embodiments, a perspective view of an aircraft having winglets is illustrated. In various embodiments, the aircraft 100 includes a fuselage 102 extending from a nose of the aircraft 100 to an empennage of the aircraft 100. In various embodiments, the empennage may include one or more tail surfaces for directional control of the aircraft 100. In various embodiments, the aircraft 100 may further include a pair of wings 106 and a pair of propulsion units 104 that may be mounted to the wings 106. In various embodiments, the aircraft 100 may include one or more aerodynamic structures 108, referred to hereafter as winglets 108, that may be fabricated from composite material. In various embodiments, each winglet 108 may be manufactured as a unitized, monolithic, composite article where internal stiffeners or spars of the winglet 108 may be integrally formed with a skin of the winglet 108 such that the winglet 108 includes a single, unitary structure. In various embodiments, the winglet 108 may include a winglet root 112 which may be joined to the wing 106 of the aircraft 100. In various embodiments, the winglet 108 may further include a winglet tip 110, a winglet leading edge 114, and a winglet trailing edge 116.

Figure 2:
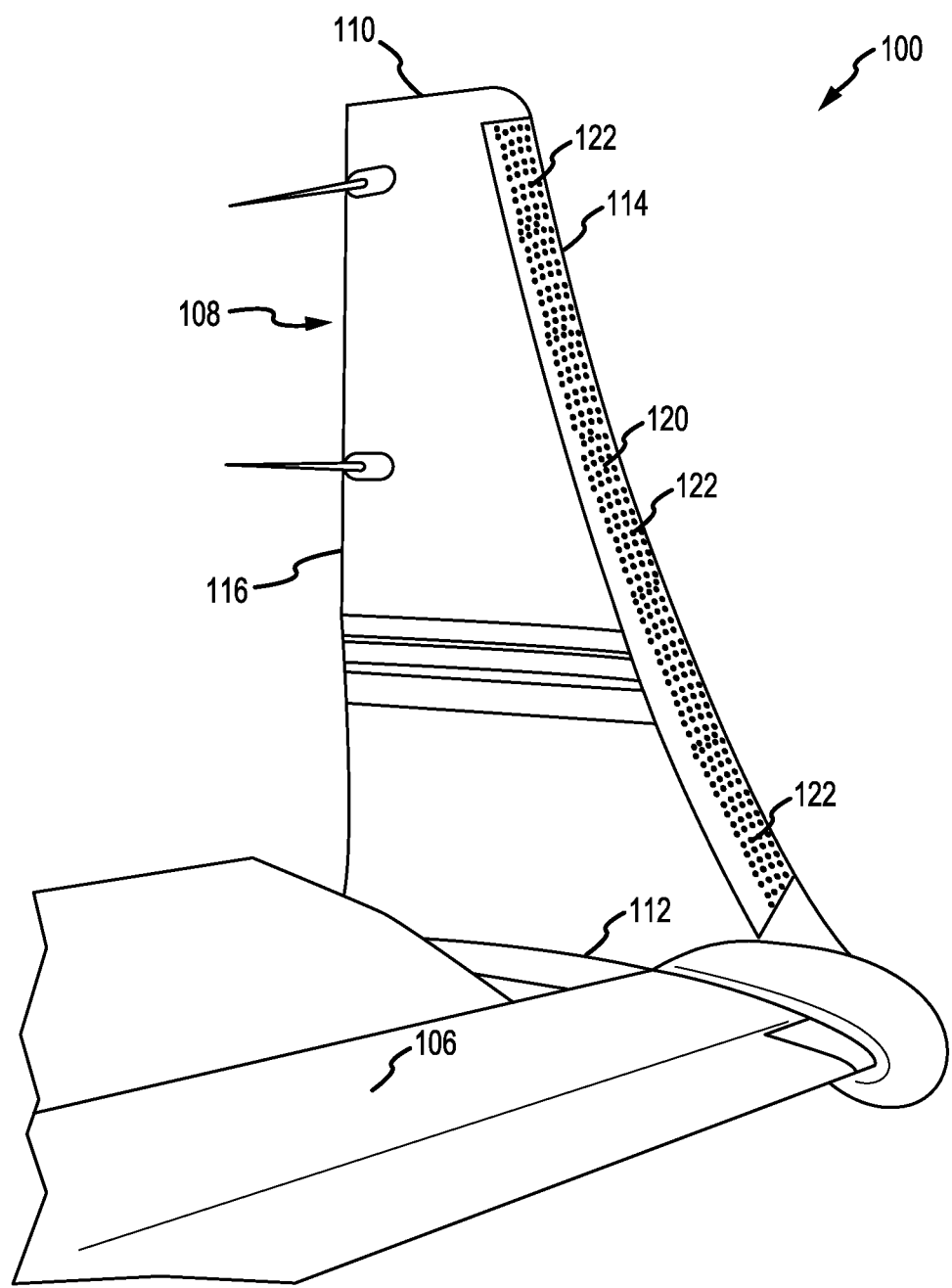
FIG. 2 illustrates a perspective view of a winglet of an aircraft, in accordance with various embodiments.

Referring now to FIG. 2, in accordance with various embodiments, a perspective view of a winglet of an aircraft is illustrated. As discussed with regard to FIG. 1, in various embodiments, the winglet 108 may include the winglet root 112, the winglet tip 110, the winglet leading edge 114, and the winglet trailing edge 116. In various embodiments, the winglet root 112 may be joined to the wing 106 of the aircraft 100. In various embodiments, the winglet 108 may further include a winglet cap 120 manufactured from a piece of material, such as metal, carbon fiber, among others, completing the winglet leading edge 114 of the winglet 108. In various embodiments, a plurality of holes 122 may be provided in the winglet cap 120 along the winglet leading edge 114 of the winglet cap 120. In various embodiments, the plurality of holes 122 along the winglet leading edge 114 of the winglet cap 120 allow light provided by back illumination to pass through and the winglet leading edge 114 of the winglet 108 may be illuminated by a pattern provided by the plurality of holes 122. In various embodiments, the plurality of holes 122 are drilled perpendicular to a face of the winglet cap 120 for manufacturing purposes, as well as strength of the material forming the winglet cap 120.

Figure 3:
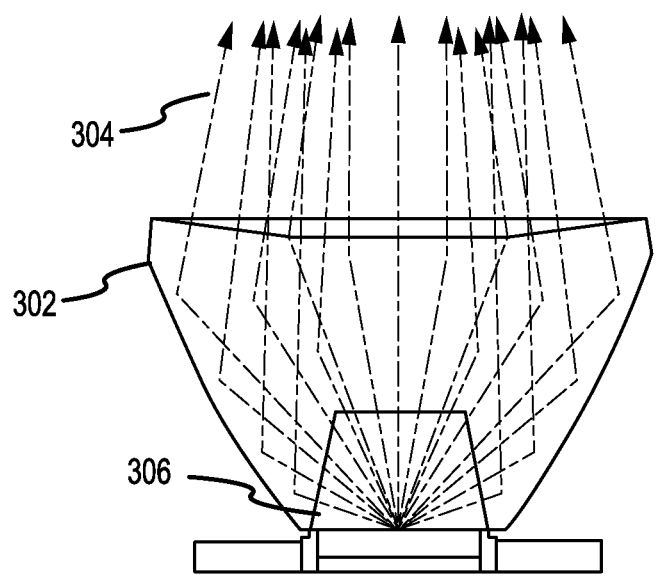
FIG. 3 illustrates a total internal reflection (TIR) lens for use in decorative lighting via a winglet cap of a winglet of an aircraft, in accordance with various embodiments.

Referring now to FIG. 3, in accordance with various embodiments, a total internal reflection (TIR) lens for use in decorative lighting via a winglet cap of a winglet of an aircraft is illustrated. In various embodiments, a TIR lens 302 is a collimating optical device for small beam angles and high Central Luminous Intensities (CLI). In various embodiments, the TIR lens 302 works on a principle of total internal reflection, which is an optical phenomenon in which light rays arriving at the interface, i.e., the internal surfaces of the TIR lens 302, are not refracted into the TIR lens 302 but rather completely reflected. That is, when light rays reach an interface between two materials with different refractive indices and the correct angle of incidence, there is refraction (bending of a light ray from its original path). As light travels from a medium with a higher refractive index to that with a lower one, Snell's law describes the angle at which the light ray gets refracted to be greater than the angle of incidence. In various embodiments, the internal surfaces of the TIR lens 302 are configured with angles of incidence exceeding a particular value such that the light rays 304 produced by a light source 306 are reflected by the material of the TIR lens 302 and aligned into a collimated beam. In that regard, in various embodiments, the TIR lens 302 is positioned in proximity to the light source 306. In various embodiments, the TIR lens 302 is positioned around the light source 306 so that the light rays 304 produced by the light source 306 reflect off the internal surfaces of the TIR lens 302. In various embodiments, the angle of incidence is more than 90°. In various embodiments, the angle of incidence at which total internal reflection occurs is referred to in the optics field as a critical angle.

Figure 4:
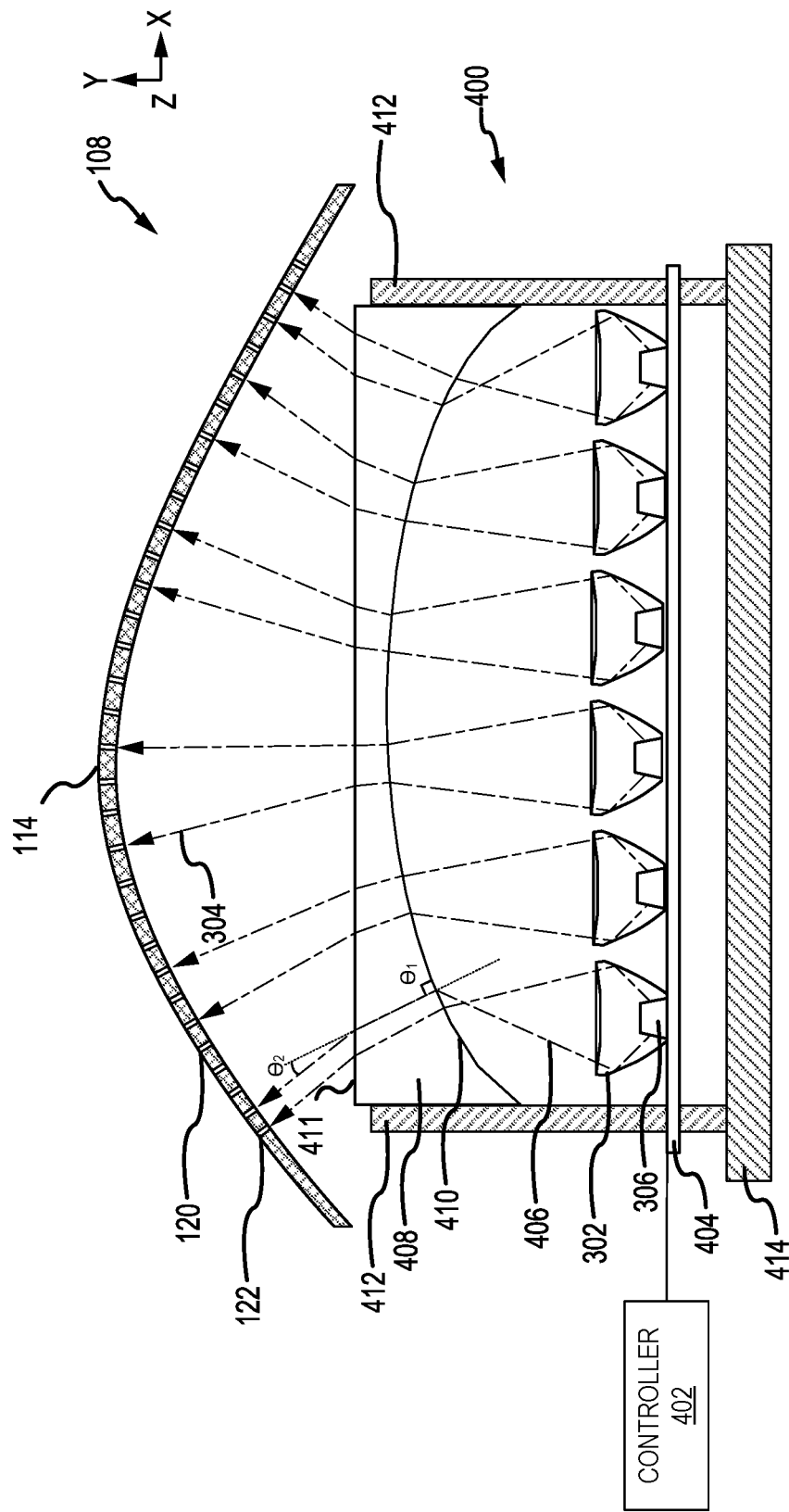
FIG. 4 illustrates a decorative lighting system for illuminating a winglet cap of a winglet of an aircraft, in accordance with various embodiments.

Referring now to FIG. 4, in accordance with various embodiments, a decorative lighting system for illuminating a winglet cap of a winglet of an aircraft is illustrated. In various embodiments, the lighting system 400 includes a controller 402 coupled to a plurality of light sources 306 via a control board 404. In various embodiments, the each of the plurality of light sources 306 may be a light emitting diode (LED), an ultra-LED, a micro-LED, an organic LED, a quantum dot LED, or a compact fluorescent light (CFL), among other light sources. In various embodiments, each of the plurality of light sources 306 may be configured to generate at least one color, such as white, red, green, blue, cyan, amber, or lime light, among others. In various embodiments, each of the plurality of light sources 306 may generate its respective color based on a command received from the controller 402. Thus, in various embodiments, the controller 402 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 402 may further include any tangible, non-transitory memory known in the art. The memory may store instructions usable by the logic device to perform operations as described herein.

In various embodiments, a TIR lens 302 is mounted over each of the light sources 306 to align the light rays 304 generated by each of the light sources 306 into collimated light beams 406. In various embodiments, the collimated light beams 406 pass through a prismatic lens 408. In various embodiments, the prismatic lens 408 is configured such that an inside surface 410 is a combination of several straight edges, i.e. edges without curvature, with different inclinations with respect to surface 411 of the prismatic lens 408. i.e., an opposing surface of the prismatic lens 408. Accordingly, in various embodiments, the inside surface 410 of the prismatic lens is configured so as to conform to winglet leading edge 114 and may be wider, narrower, or the same size as the control board 404 so long as the light rays 304 from the collimated light beams 406, after passing through the prismatic lens 408, are able to pass through the plurality of holes 122 in the winglet cap 120. In various embodiments, upon a collimated light beam 406 contacting one straight edge of the several straight edges of the inside surface 410 of the prismatic lens 408, the light rays 304 of the collimated light beam 406 bend towards the normal are so as to be substantially perpendicular, i.e. at substantially a 90-degree angle $\theta_1$, to the associated straight edge of the inside surface 410. That is, in various embodiments, the TIR lens 302 organizes light from the light source 306, which is then transmitted to the prismatic lens 408 as the collimated light beams 406. When the light rays the light rays 304 of the collimated light beam 406 leave the prismatic lens 408 at surface 411, the light rays 304 bend away from the normal at angle $\theta_1$ at an angle $\theta_2$ so that the light hits substantially normal to the curved surface of the winglet cap thereby passing through the plurality of holes 122 that have been drilled perpendicular to the face of the winglet cap 120. In various embodiments, the inside surface of the prismatic lens 408 may be formed based on the contour of a skin of the winglet cap 120 in order to enhance the light transmitted out the plurality of holes 122 in the skin of the winglet cap 120. In that regard, the inside surface of the prismatic lens 408 substantially matches the contour of the winglet cap 120. The terms "substantially," "about," or "approximately" as used herein represent an amount close to the stated amount that still performs a desired function or achieves a desired result. For example, the term "substantially," "about," or "approximately" may refer to an amount that is within 5 degrees, within 3 degrees, within 2 degrees, or within 1 degree of a stated amount or value.

In various embodiments, the control board 404 and the prismatic lens 408 may be coupled to support posts 412 that are coupled to support structure 414 within the winglet 108. In various embodiments, the support posts 412 are configured so as to increase or decrease a mating distance between the control board 404 and/or the prismatic lens 408 and the inside surface of the winglet cap 120. In that regard, in various embodiments, both the control board 404 and the prismatic lens 408 may each translate in a y-direction irrespective of each other.

Figure 5:
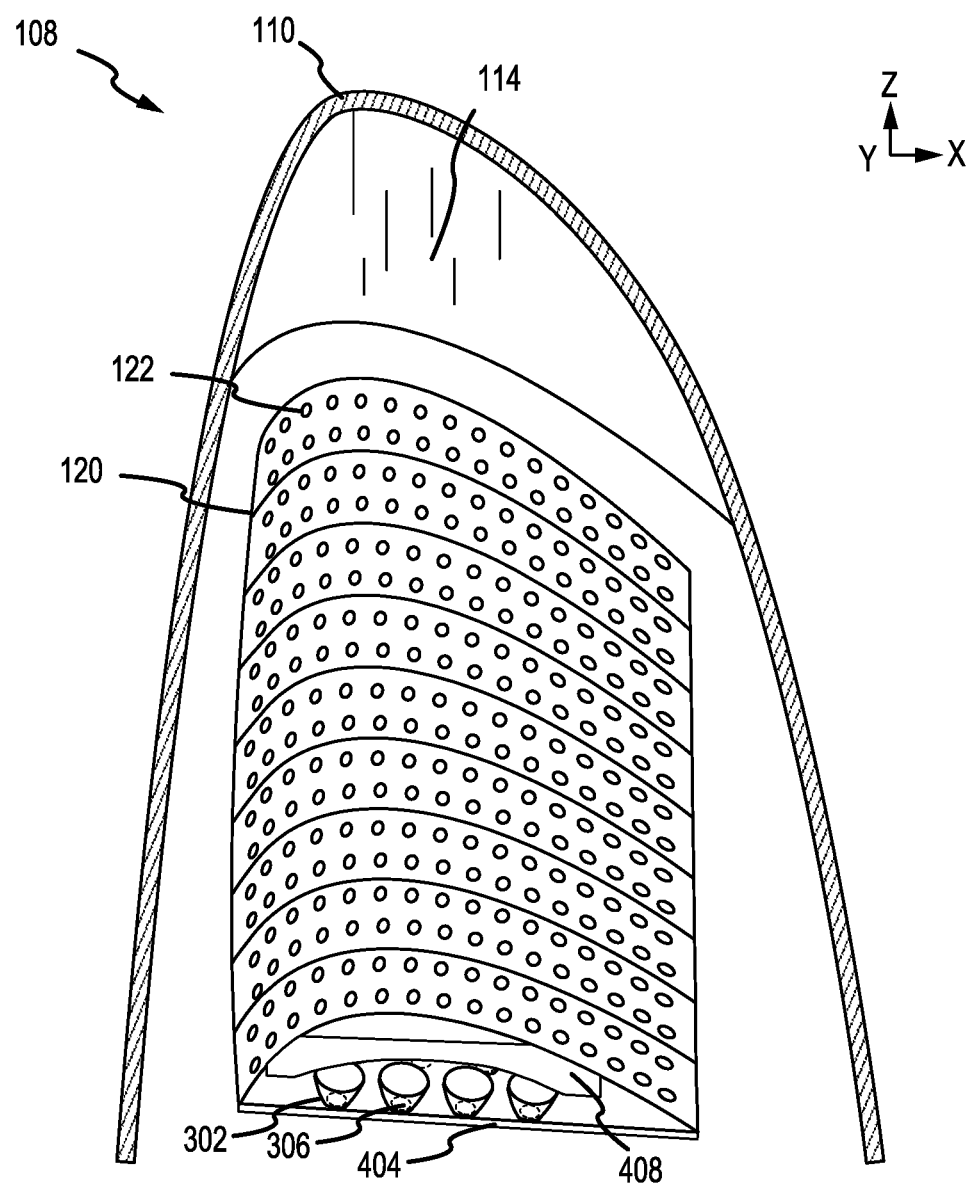
FIG. 5 illustrates a decorative lighting system disposed within a winglet cap of a winglet of an aircraft, according to various embodiments.

Referring now to FIG. 5, in accordance with various embodiments, a decorative lighting system disposed within a winglet cap of a winglet of an aircraft is illustrated. As discussed with regard to FIGS. 1 and 2, in various embodiments, the winglet 108 may include the winglet tip 110 and the winglet leading edge 114. In various embodiments, the winglet 108 may further include a winglet cap 120 completing the winglet leading edge 114 of the winglet 108. In various embodiments, a plurality of holes 122 may be provided in the winglet cap 120 along the winglet leading edge 114 of the winglet cap 120. In various embodiments, the plurality of holes 122 along the winglet leading edge 114 of the winglet cap 120 allow light provided by the lighting system 400 described in FIG. 4 to pass through the plurality of holes 122 of the winglet leading edge 114. Thus, the winglet leading edge 114 of the winglet 108 may be illuminated by a pattern provided by the plurality of holes 122. In that regard, in various embodiments, the plurality of holes 122 may take the form of a pattern representing a branding of an enterprise. In various embodiments, the plurality of holes 122 are drilled perpendicular to a face of the winglet cap 120 for manufacturing purposes, as well as strength of the material forming the winglet cap 120.

Therefore, in various embodiments, the winglets caps on the winglets of an aircraft are manufactured so as to provide an attractive decorative design and giving the aircraft a unique identification. In various embodiments, the prismatic lens is positioned at predetermined distance from the leading edge of the winglet cap that is normal of the outmost holes within the winglet leading edge of the winglet cap. In various embodiments, the light provided by the plurality of light sources is projected through the prismatic lens and out through the holes in the winglet cap. In various embodiments, the plurality of light sources may be controlled via a controller so as to provide a single light color of multiple light colors as controlled by the controller. Accordingly, by illuminating the winglets of an aircraft, additional visibility, improved decorative aspects, and brand promotion may be provided.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for illuminating a winglet cap of a winglet, the system comprising:
   the winglet, the winglet cap positioned on a leading edge of the winglet;
   a light source disposed within the winglet;
   a total internal reflection (TIR) lens positioned in proximity to the light source; and
   a prismatic lens positioned between the light source and the winglet cap, wherein light produced by the light source reflects off a surface of the TIR lens and passes through the prismatic lens, and
   wherein the prismatic lens bends the light and directs the light toward an inside surface of the winglet cap, and
   wherein the light source and the prismatic lens are coupled to support structures that allow the light source and/or the prismatic lens to translate so as to either increase or decrease a mating distance between the light source and/or the prismatic lens and the inside surface of the winglet cap.

2. The system of claim 1, wherein the TIR lens surrounds the light source.

3. The system of claim 1, wherein the light reflected off the surface of the TIR lens contacts the inside surface of the prismatic lens and wherein the inside surface of the prismatic lens is a combination of several straight edges with different inclinations with respect to an opposing surface of the prismatic lens.

4. The system of claim 3, wherein, responsive to the light reflected off the surface of the TIR lens contacting a straight edge of the inside surface of the prismatic lens, the light is bent towards a normal of the straight edge so that the light is transmitted through the prismatic lens substantially perpendicular to the straight edge, and wherein, responsive to the light exiting an outside surface of the prismatic lens, the light is bent away from the normal of the straight edge.

5. The system of claim 3, wherein the inside surface of the prismatic lens is formed to substantially match a contour of the winglet cap.

6. The system of claim 1, wherein the winglet cap further includes a plurality of holes through which the light passes.

7. The system of claim 6, wherein the plurality of holes is configured in a pattern within the winglet cap.

8. The system of claim 6, wherein the plurality of holes are drilled perpendicular to a face of the winglet cap.

9. The system of claim 1, wherein the light source is at least one of a light emitting diode (LED), an ultra-LED, a micro-LED, an organic LED, a quantum dot LED, or a compact fluorescent light (CFL).

10. An aircraft comprising a system for illuminating a winglet cap of a winglet, the aircraft comprising:
the aircraft;
the winglet coupled to a wing of the aircraft:
the winglet cap positioned on a leading edge of the winglet;
a light source disposed within the winglet:
a total internal reflection (TIR) lens positioned in proximity to the light source;
a prismatic lens positioned between the light source and the winglet cap;
a controller; and
a tangible, non-transitory memory configured to communicate with the controller, the tangible, non-transitory memory having instructions stored thereon that, in response to execution by the controller, cause the controller to perform operations comprising:
controlling the light source to generate a first light, wherein the first light produced by the light source reflects off of a surface of the TIR lens and passes through the prismatic lens, wherein the prismatic lens bends the first light and directs the first light toward an inside surface of the winglet cap, and wherein the light source and the prismatic lens are coupled to support structures that allow the light source and/or the prismatic lens to translate so as to either increase or decrease a mating distance between the light source and/or the prismatic lens and the inside surface of the winglet cap.

11. The aircraft of claim 10, wherein the TIR lens surrounds the light source.

12. The aircraft of claim 10, wherein the first light reflected off of the surface of the TIR lens contacts the inside surface of the prismatic lens and wherein the inside surface of the prismatic lens is a combination of several straight edges with different inclinations with respect to an opposing surface of the prismatic lens.

13. The aircraft of claim 12, wherein, responsive to the first light reflected off the surface of the TIR lens contacting a straight edge of the inside surface of the prismatic lens, the first light is bent towards a normal of the straight edge so that the first light is transmitted through the prismatic lens substantially perpendicular to the straight edge, and wherein, responsive to the light exiting an outside surface of the prismatic lens, the light is bent away from the normal of the straight edge.

14. The aircraft of claim 12, wherein the inside surface of the prismatic lens is formed to substantially match a contour of the winglet cap.

15. The aircraft of claim 10, wherein the winglet cap further includes a plurality of holes through which the first light passes.

16. The aircraft of claim 15, wherein the plurality of holes is configured in a pattern within the winglet cap.

17. The aircraft of claim 15, wherein the plurality of holes are drilled perpendicular to a face of the winglet cap.

18. The aircraft of claim 15, wherein the light source is at least one of a light emitting diode (LED), an ultra-LED, a micro-LED, an organic LED, a quantum dot LED, or a compact fluorescent light (CFL).

* * * * *